US 8,174,990 B2

(12) United States Patent
Dan et al.

(10) Patent No.: US 8,174,990 B2
(45) Date of Patent: May 8, 2012

(54) MECHANISM AND SYSTEM FOR PROGRAMMABLE MEASUREMENT OF AGGREGATE METRICS FROM A DYNAMIC SET OF NODES

(75) Inventors: Asit Dan, Pleasantville, NY (US);
Richard P. King, Scarsdale, NY (US);
Heiko Ludwig, New York, NY (US);
Andrea Schmidt, Boeblingen (DE);
Hendrik Wagner, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 11/676,074

(22) Filed: Feb. 16, 2007

(65) Prior Publication Data
US 2008/0198757 A1  Aug. 21, 2008

(51) Int. Cl.
*H04L 12/26* (2006.01)
(52) U.S. Cl. .................................. 370/241; 370/252
(58) Field of Classification Search .............. 370/252, 370/241; 709/200, 224, 226; 718/104, 105
See application file for complete search history.

(56) References Cited

U.S. PATENT DOCUMENTS

| | | | |
|---|---|---|---|
| 5,053,981 A * | 10/1991 | Ogata et al. ............... 702/57 |
| 5,790,431 A | 8/1998 | Ahrens, Jr. et al. |
| 6,021,438 A * | 2/2000 | Duvvoori et al. ............. 709/224 |
| 6,269,401 B1 | 7/2001 | Fletcher et al. |
| 6,349,335 B1 | 2/2002 | Jenney |
| 6,751,573 B1 | 6/2004 | Burch |
| 7,694,070 B2 * | 4/2010 | Mogi et al. .............. 711/112 |
| 2004/0219909 A1 * | 11/2004 | Kennedy et al. ............ 455/422.1 |
| 2007/0094379 A1 * | 4/2007 | Stecher et al. .............. 709/224 |
| 2007/0185984 A1 * | 8/2007 | Roth ............................. 709/223 |
| 2007/0283329 A1 * | 12/2007 | Caprihan et al. .............. 717/127 |

FOREIGN PATENT DOCUMENTS

EP  0585479 A1  3/1994

OTHER PUBLICATIONS

Smith, Adam; An Inquiry into the Nature and Causes of the Wealth of Nations; 1904, 5th edition, Chapter 6.*
Royer, E.; Toh, C.; A Review of Current Routing Protocols for Ad Hoc Mobile Wireless Networks; 1999; IEEE; 52.*
H. Ludwig, et al., Web Service Level Agreement (WSLA) Language Specification. V1.0. IBM Corporation, 2002.
A. Keller, et al., The WSLA Framework—Specifying and Monitoring Service Level Agreements for Web Services Journal of Network and System Management (11), Nr. 1, Special Issue on E-Business Management, Plenum Publishing Corporation, Mar. 2003.
H. Ludwig et al., A Service Level Agreement Language for Dynamic Electronic Services, Electronic Commerce Research (3), Nr. 1, pp. 43-59, Kluwer Academic Publishers, 2003.

* cited by examiner

*Primary Examiner* — Derrick Ferris
*Assistant Examiner* — Christopher R Crompton
(74) *Attorney, Agent, or Firm* — F. Chau & Associates, LLC; Louis J. Percello

(57) ABSTRACT

A method for measuring performance of system. The method includes the steps of retrieving a metric definition from a declarative metrics specification, obtaining a list of computing nodes from a database that are currently assigned to the metric definition, obtaining resource data provided by the computing nodes in the list of computing nodes and determining the metric of system performance based on the metric definition and the resource data. The computing nodes in the list of computing nodes are nodes of a cluster of nodes having a dynamically varying node count.

18 Claims, 12 Drawing Sheets

MECHANISM AND SYSTEM FOR PROGRAMMABLE MEASUREMENT OF AGGREGATE METRICS FROM A DYNAMIC SET OF NODES

TECHNICAL FIELD OF THE INVENTION

The present disclosure relates generally to the field of computerized measurement systems, and more specifically to a method and computerized measurement system that enables automatic management of dynamic clusters of nodes.

BACKGROUND

Management of clusters of nodes requires the measurement of aggregate cluster properties specific to a particular application under consideration. Programmable metrics collection from resources and their aggregation aids the computation of custom metrics relevant for monitoring of system performance for multiple purposes such as accounting, load management, etc. This requires that metrics be collected from the instrumentation of the nodes of a cluster and aggregated to metrics that are input to the automated or manual management function of a cluster. A system that performs this aggregation is a measurement system.

Writing measurement systems from scratch can be a large effort. Each time a management function changes, the measurement system must be rewritten. Furthermore, when the cluster configuration changes (e.g., a node is added or deleted), the measurement system must again be rewritten.

Existing measurement systems are either custom-built or use a simple declarative specification as input to configure the kinds of metrics that can not accommodate dynamic clusters. An example of a conventional metric system which uses its own specific language is WSLA (Web Service Level Agreement).

WSLA uses metrics definitions which describe how complex metrics are to be computed from low-level metrics that are exposed during the instrumentation of a system. While the system is in use a measurement system can read the low-level metrics, compute the complex metrics by aggregating the low-level metrics as specified in the metrics definitions, and make them available to interested systems.

However, such existing measurement systems and their corresponding languages are not able to aggregate sets of equivalent metrics from a variable number of different nodes. For example, a cluster of computers may be used for multiple applications. Computers are assigned to different applications depending on the current demand for those applications. In such a dynamic environment, the set of computers assigned to a particular application is constantly changing.

The metrics language of WLSA requires that the metrics program it uses to capture complex metrics be re-written to take into account an added or deleted node. However, this approach is unsuitable for dynamically changing clusters because it is too labor intensive and slow, and hence unsuitable for automated real-time management.

Thus, there is a need for a measurement system and method which can efficiently compute complex metrics for a dynamic system having a constantly varying number of nodes.

SUMMARY OF THE INVENTION

According to an exemplary embodiment of the present invention, a method for measuring performance of a system is provided. The method includes the steps of retrieving a metric definition from a declarative metrics specification, obtaining a list of computing nodes from a database that are currently assigned to the metric definition, obtaining resource data provided by the computing nodes in the list, and determining the metric of system performance based on the metric definition and the resource data. The computing nodes in the list of computing nodes are nodes of a cluster of computing nodes having a dynamically varying node count.

According to an exemplary embodiment of the present invention, a program storage device readable by machine, tangibly embodying a program of instructions executable by the machine to perform method steps for measuring performance of a system is provided. The method steps include retrieving a metric definition from a declarative metrics specification, obtaining from a database a list of computing nodes that are currently assigned to the metric definition, obtaining resource data of the computing nodes in the list of computing nodes, and determining a metric of system performance based on the metric definition and the resource data. The list of computing nodes are nodes of a cluster of computing nodes having a dynamically varying node count.

According to an exemplary embodiment of the present invention, a measuring system for measuring performance of a system is provided. The measuring system includes a metrics loading unit, a metrics managing unit, and a metrics computation unit. The metrics loading unit is for receiving a declarative metrics specification as input and parsing the declarative metrics specification for a metric definition. The metrics managing unit maintains a list of computing nodes corresponding to the metric definition. The metrics computation unit determines a metric of system performance from the metric definition, the list of computing nodes, and resource data provided by nodes in the list of computing nodes. The computing nodes in the list of computing nodes are nodes of a cluster of computing nodes having a dynamically varying node count.

These and other exemplary embodiments, aspects, features and advantages of the present invention will be described or become more apparent from the following detailed description of exemplary embodiments, which is to be read in connection with the accompanying figures.

DETAILED DESCRIPTION OF EXEMPLARY EMBODIMENTS

In general, exemplary embodiments of the invention as described in further detail hereafter include systems and methods which measure a metric from among a dynamically varying number of computing nodes. The metric is typically a system performance metric and may include a variety of metrics such as for example, time between failure, time to repair, current queue lengths, average queue lengths, buffer size, memory usage, storage usage, number of sockets, number of connections, number of dropped connections, amount of jitter, number of concurrent users, etc.

Exemplary systems and methods which measure a metric from among a dynamically varying number of nodes will now be discussed in further detail with reference to illustrative embodiments of FIGS. 1-12. It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
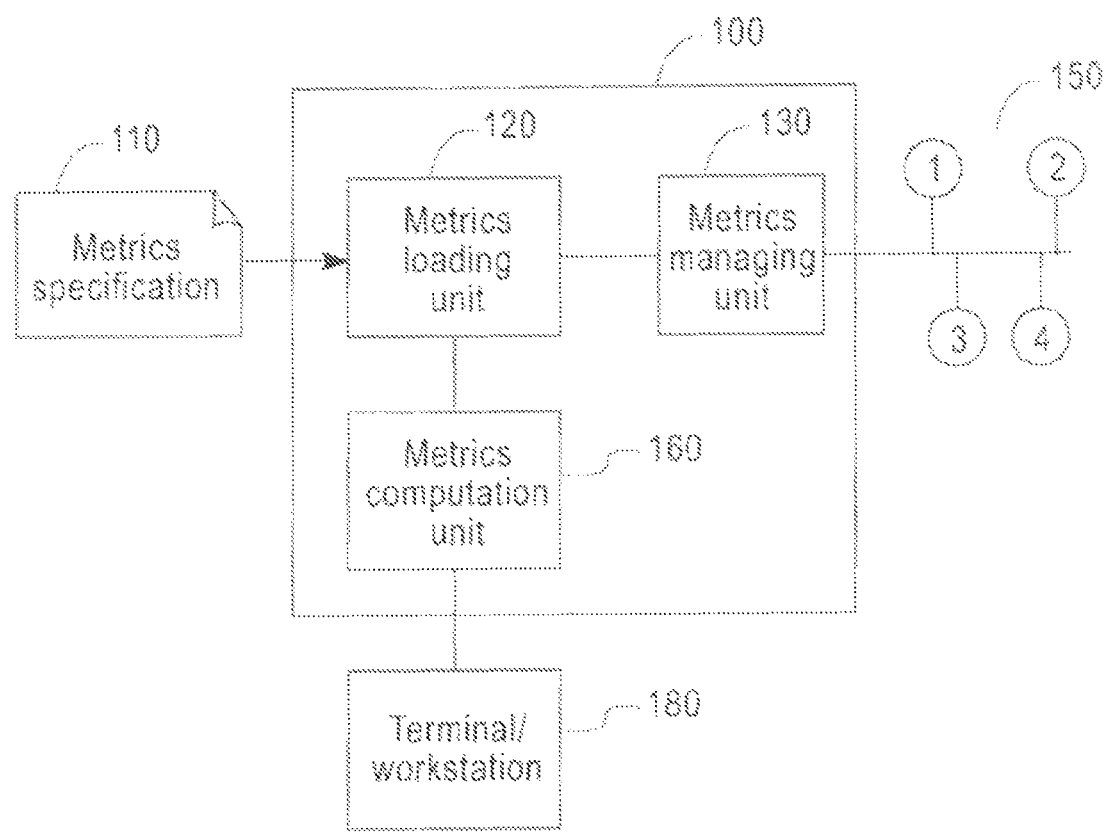
FIG. 1 is a high-level block diagram of a measuring system according to an exemplary embodiment of the present invention.

FIG. 1 is a high-level block diagram of a measuring system according to an exemplary embodiment of the present invention. Referring to FIG. 1, the measuring system 100 includes a metrics loading unit 120, a metrics managing unit 130, and a metrics computation unit 160. The measuring system 100 measures a metric among a set of nodes of a cluster of nodes 150, where the size of the set of nodes and the size of the cluster of nodes 150 can vary dynamically over time. Each of the nodes of the cluster of nodes 150 may correspond to a different workstation communicating across a common network. Although only 4 nodes are illustrated in FIG. 1 the present invention is not limited thereto, as any number of nodes may be present.

The metrics loading unit 120 receives a declarative metrics specification 110 as input. A metrics specification is written in a measurement specification language. The language may include constant definitions for simple types and schedules and definitions of functions over types, e.g., arithmetic functions, functions to create time series, stochastic functions, and functions to refer to aggregate metrics. The language may further include constructs to define metrics, aggregate metrics, and measurement directives specific to the type of instrumentation exposed by a class of nodes. The class of nodes may be a set of computer nodes or other managed resource that exposes data via sensors.

The metrics loading unit 120 parses the metrics specification 110 for metric definitions which include metrics, constants, functions, and directives. The constants definitions in the declarative metric specification 110 may include times and schedules besides plain constants. Each of the metric definitions may include a metric name, a metric type, a metric function, and a measurement directive. A metric function operates on a set of constants and metrics, e.g., divide(metric1, 5), mean(metric1, metric2), etc. A measurement directive defines how to retrieve data from the instrumentation of a node.

The metrics definitions may include metrics sets (i.e., aggregate metrics) which are syntactic constructs to deal with autonomic elements that manage dynamic sets of elements which expose the same underlying metrics. These underlying metrics include basic and complex metrics. Basic metrics correspond to resource metrics read or received from instrumentation or gained by probing. Complex metrics are composed from other basic metrics. A typical example is a cluster of computing nodes that changes in size depending on its workload at a given point in time. Each of the nodes exposes the same set of basic and complex metrics, e.g., an average response time. Complex metrics outside the metric set can treat metrics in metric sets as dynamic arrays of metrics over which aggregation operations such as Sum, Mean, etc. can be applied.

Figure 2:
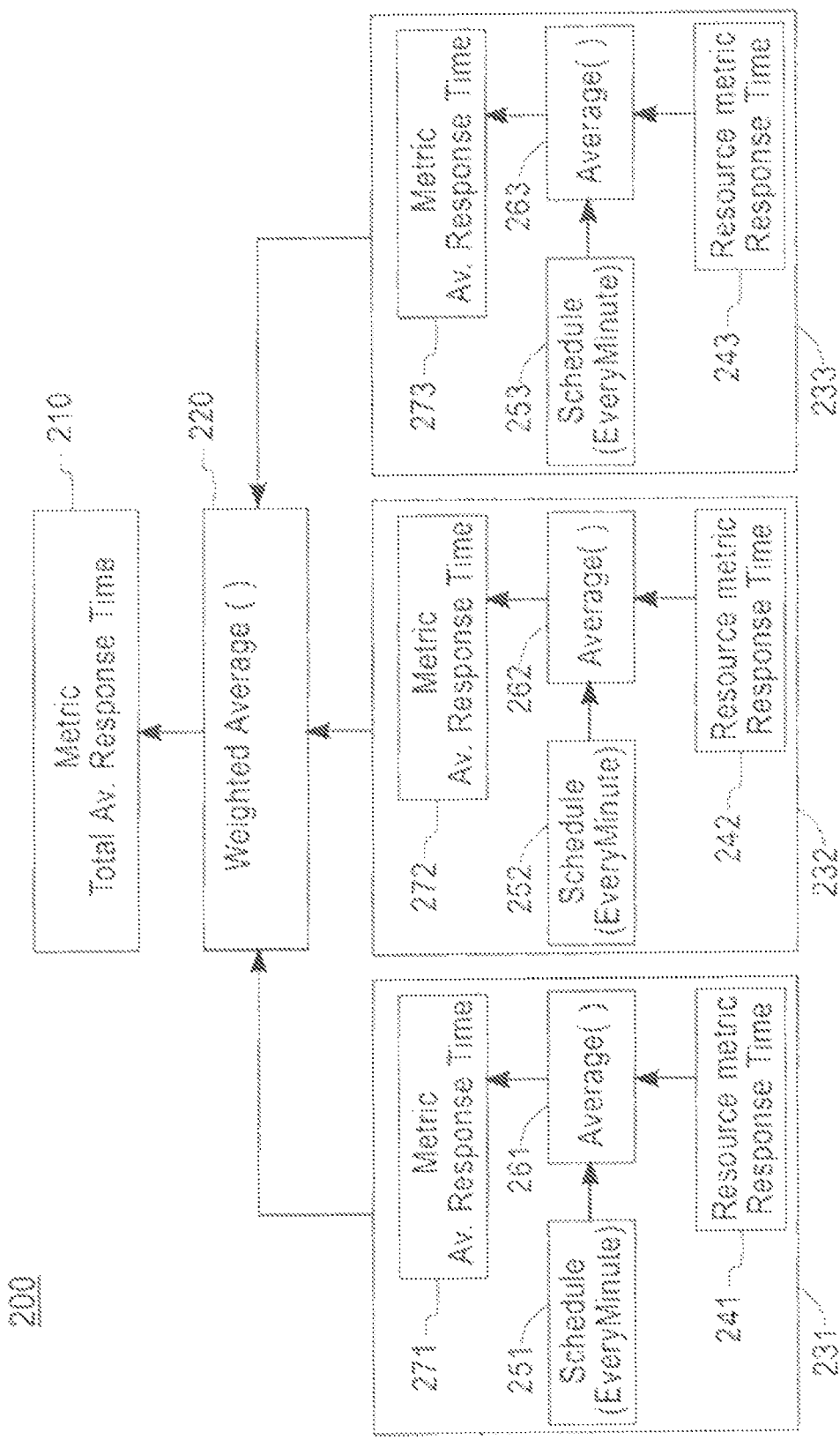
FIG. 2 illustrates a metric set (i.e., an aggregate metric) according to an exemplary embodiment of the present invention.

FIG. 2 illustrates a metric set 200 according to an exemplary embodiment of the present invention. Referring to FIG. 2, the metric set 200 represents the total average response time of an application executed on three computing nodes. The metric set 200 includes three metric elements 231, 232 and 233. The metric elements 231-233 include corresponding data collection functions 241, 242, and 243, scheduling functions 251, 252, and 253, and averaging functions 261, 262, and 263. The data collection functions 241-243 capture a snapshot of the current application response time of the application executed on a corresponding computing node. The averaging functions 261-263 compute a running average response time using data sampled by the data collection functions 241-243 and at a periodic rate determined by the corresponding scheduling functions 251-253. While only three metric elements are shown for ease of illustration in FIG. 2, the present invention is not limited thereto and supports a dynamic number of metric elements based on the current number of computing nodes. The total average response time 210 is computed by applying a weighted average function 220 over the sum of individual average response times 271, 272, 273 computed by each of the metric elements 231-233.

Figure 3:
FIG. 3 illustrates an embodiment of a declarative metrics specification according to an exemplary embodiment of the present invention.

FIG. 3 illustrates a metrics specification 300 according to an exemplary embodiment of the present invention. The metric specification 300 includes a parent metric 310 which may reference a metric set 320. The metric set 320 may include one or more dependent metrics. FIG. 3 illustrates a metric set named "NodeSet" with dependent metrics 322, 324, and 326. The metric set 320 can be used to compute the number of invocations of an application on a cluster of computing nodes. The parent metric 310 may be used to compute the sum of all current members of the metric set 320, as defined in the "MSConstructor" function. Although FIG. 3 illustrates that the metrics specification 300 is written using EXtensible Markup Language (XML), the specification is not limited to XML and may be written in any other suitable language.

Referring back to FIG. 1 the metrics managing unit 130 maintains node membership information for a metric set (hereinafter referred to as an aggregate metric). The metrics computation unit 160 computes the aggregate metric from an aggregate metric definition, node membership information, and resource data provided by nodes in the node membership information. The nodes in the node membership information correspond to a subset of nodes which provide resource data for the aggregate metric. The subset of nodes are part of the cluster of nodes 150, which the measuring system 100 is electrically connected to for measuring. Although the measuring system 100 is illustrated as being wired to the cluster of nodes 150, the present invention is not limited thereto, as the measuring system 100 may be wirelessly connected to the cluster of nodes 150 via a wireless router or other equivalent wireless technology.

The measuring system 100 may include a cluster manager for managing node changes to the cluster of nodes 150. The cluster manager may provide notifications of changes about the cluster of nodes 150 to the metrics managing unit 130. These changes may include additions of new nodes and deletion of existing nodes which the metrics managing unit 130 can use to update the node membership information. The resource data provided by the nodes may be provided to the cluster manager for forwarding to the metrics managing unit 130.

The measuring system 100 may include a metrics publisher which communicates across a network to a terminal or workstation 180 to allow a user to register with the metrics publisher to receive an aggregate metric computed based on the aggregate metric definition and the resource data of the nodes in the node membership information.

The measuring system 100 may also include a data provider generating unit which generates data providers for each of the nodes in the node membership information. The data providers may receive low-level sensor data from each of the corresponding nodes based on the aggregate metric definition. The low-level sensor data may be aggregated into the resource data.

The measuring system 100 may further include a metrics scheduling unit for triggering the metrics computation unit 160 to recompute the aggregate metric at a periodic rate based on a constant or a scheduling parameter read in from the declarative metrics specification 110.

The measuring system 100 may further include a metrics repository for the storing a digital copy of the declarative metrics specification 110 as a backup. If a new metrics metrication is later loaded and determined to be in error, the backup specification can be switched to without having to re-load it, thereby saving time.

Figure 4:
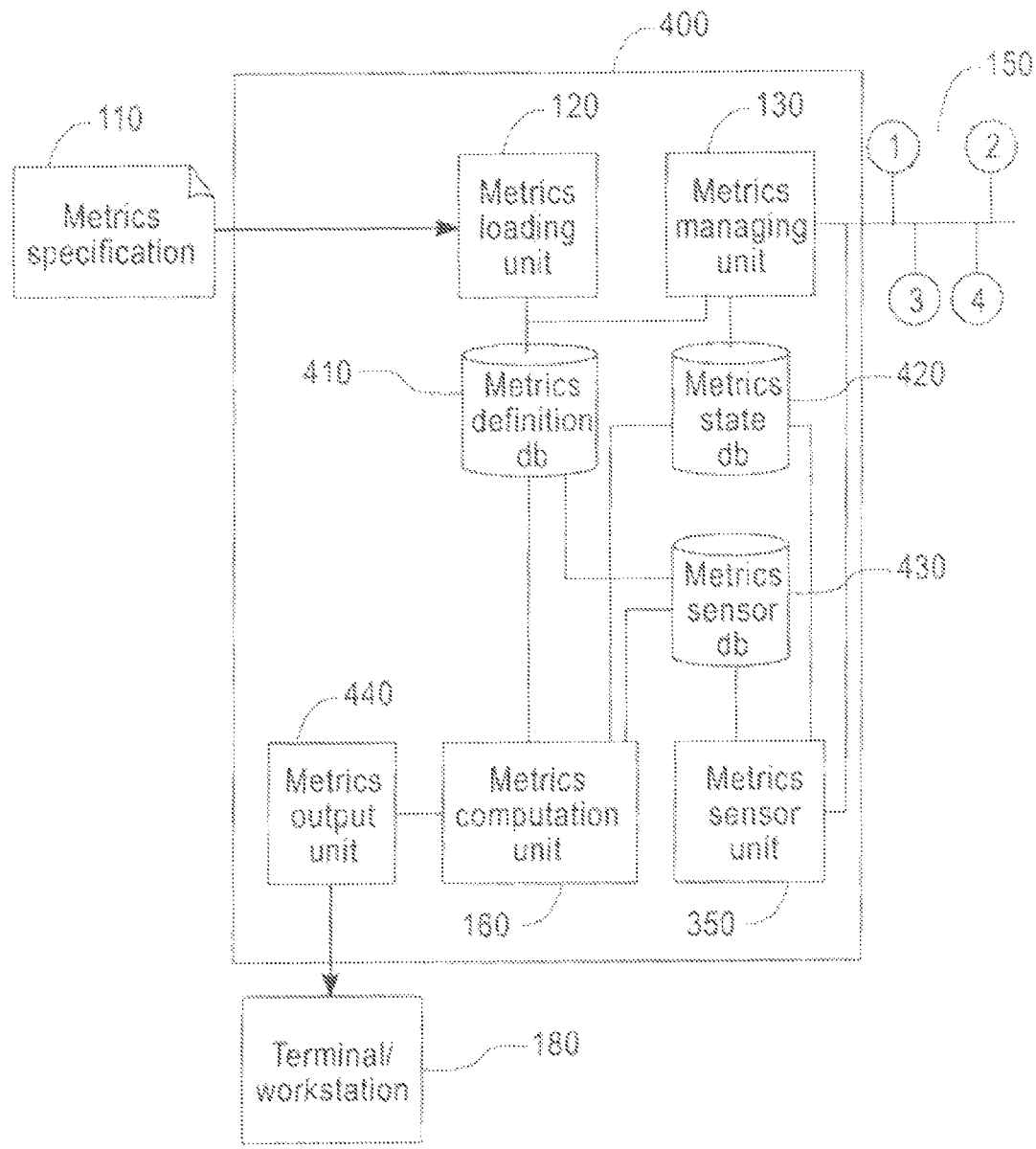
FIG. 4 is a block diagram of a measuring system according to an exemplary embodiment of the present invention.

FIG. 4 is a block diagram of a measuring system 400 according to an exemplary embodiment of the present invention. Referring to FIG. 4, the measuring system 200 includes a metrics loading unit 120, a metrics definition database 410, a metrics managing unit 130, a metrics state database 420, a metrics computation unit 160, a metrics sensor unit 450, a metrics sensor database 430, and a metrics output unit 440.

The measuring system 400 is connected to a cluster of nodes 150 for monitoring. The measuring system 400 is further connected to a terminal or workstation 180 for output of measurements made while monitoring the cluster of nodes 150.

The metrics loading unit 120 reads in the declarative metrics specification 110, parses out the metric definitions, and stores the definitions in the metrics definition database 410. The metric definitions may include basic, complex, and aggregate metric definitions, which respectively correspond to definitions of basic, complex, and aggregate metrics. Examples of basic metrics are the time spent processing an application (T) and the number of invocations of the application (N). A complex metric can be derived from basic metrics. An example of a complex metric is the average response time of an application (A=T/N) which is computed by dividing the basic metric of the time processing the application (T) by the basic metric of the number of invocations of the application (N). An aggregate metric is an aggregation of metrics over several nodes. An example of an aggregate metric is the average response time of the application over the cluster of nodes 150. For example, assuming the application is only executed on nodes 1 and 2 if the response time of the application on node 1 is one second, and the response time of the application on node 2 is three seconds, the aggregate metric of average application response time is computed to be two seconds.

The metric managing unit 130 maintains metrics state information about the metrics definitions. The metric managing unit monitors the cluster of nodes 150 for state changes and stores these state changes as metrics state information in the metrics state database 420. When one of the metric definitions is an aggregate metric definitions the metrics state information includes the current node membership of that aggregate metric definition. The current node membership represents a set of the nodes of the cluster of nodes 150 which yield sensor data which can be used to compute an aggregate metric based on the aggregate metric definition. In the above example, the current node membership for the aggregate metric of average application response time is nodes 1 and 2 or {1,2}. The node membership is dynamic and not embedded within the aggregate metric definition, thereby supporting dynamic nodes. So if a new node which executes the application is added to the cluster of nodes 150 or an existing node of the cluster of nodes 150 begins or stops executing the application, only the current node membership of the aggregate metric in the metrics state database 420 need be updated. As an example if node 3 begins executing the application, the current node membership would change from {1,2} to {1,2,3}.

The metrics sensor unit 450 monitors and retrieves sensor data from the cluster of nodes 150 based on the metrics definitions stored in the metrics definition database 410 for storage in the metrics sensor database 430. Sensor data is typically of a low-level and may directly correspond to a basic metric. The fact that the number of invocations for node 1 is currently seven is an example of sensor data.

The metrics computation unit 160 computes metrics based on their corresponding metric definition stored in the metrics definition database 410, the metrics state information stored in the metrics state database 420, and sensor data stored in the metrics sensor database 430.

For example, assume that an aggregate metric is the average number of invocations of application A across the cluster of nodes 150. The aggregate metric definition that defines the aggregate metric is stored in the metrics definition database 410. The aggregate metric definition describes that the average is calculated by summing the number invocations of the application over a set of the measured nodes executing the application and dividing that sum by the count of that set. The metrics managing unit 130 monitors the cluster of nodes 150 for state changes relating to the aggregate metric. Assume that the metrics managing unit 130 determines that nodes 2 and 3 are the only nodes now executing application A. The metrics managing unit 130 then updates the current node membership of the aggregate metric in the metrics state database 420 to {2,3}. The metrics sensor unit 450 retrieves the number of invocations of application A for each of the nodes of the cluster of nodes 150 and stores the sensor data in the metrics sensor database 430. The metrics computation unit 160 knows to retrieve the sensor data for nodes 2 and 3 from the metrics sensor database 430 because the metrics state database 420 indicates the current node membership of the aggregate metric AM is {2,3}. Assume that the sensor data for node 2 is an invocation count of 8 and the sensor data for node 3 is an invocation count of 6. The metrics computation unit 160 then calculates the aggregate metric AM to be (8+6)/2, i.e., 7, based on the aggregate metrics definition of the aggregate metric AM in the metrics definition database 410.

The metrics output unit 440 can then output the computed metric to an interested terminal or workstation 180. The metrics output unit 440 may communicate to the terminal or workstation 180 remotely across a network.

The measuring system 400 may be remotely connected to the cluster of nodes 150 across a network. While only four nodes are illustrated in the cluster of nodes 150, the present invention is not limited thereto, and may include any number of nodes.

Figure 5:
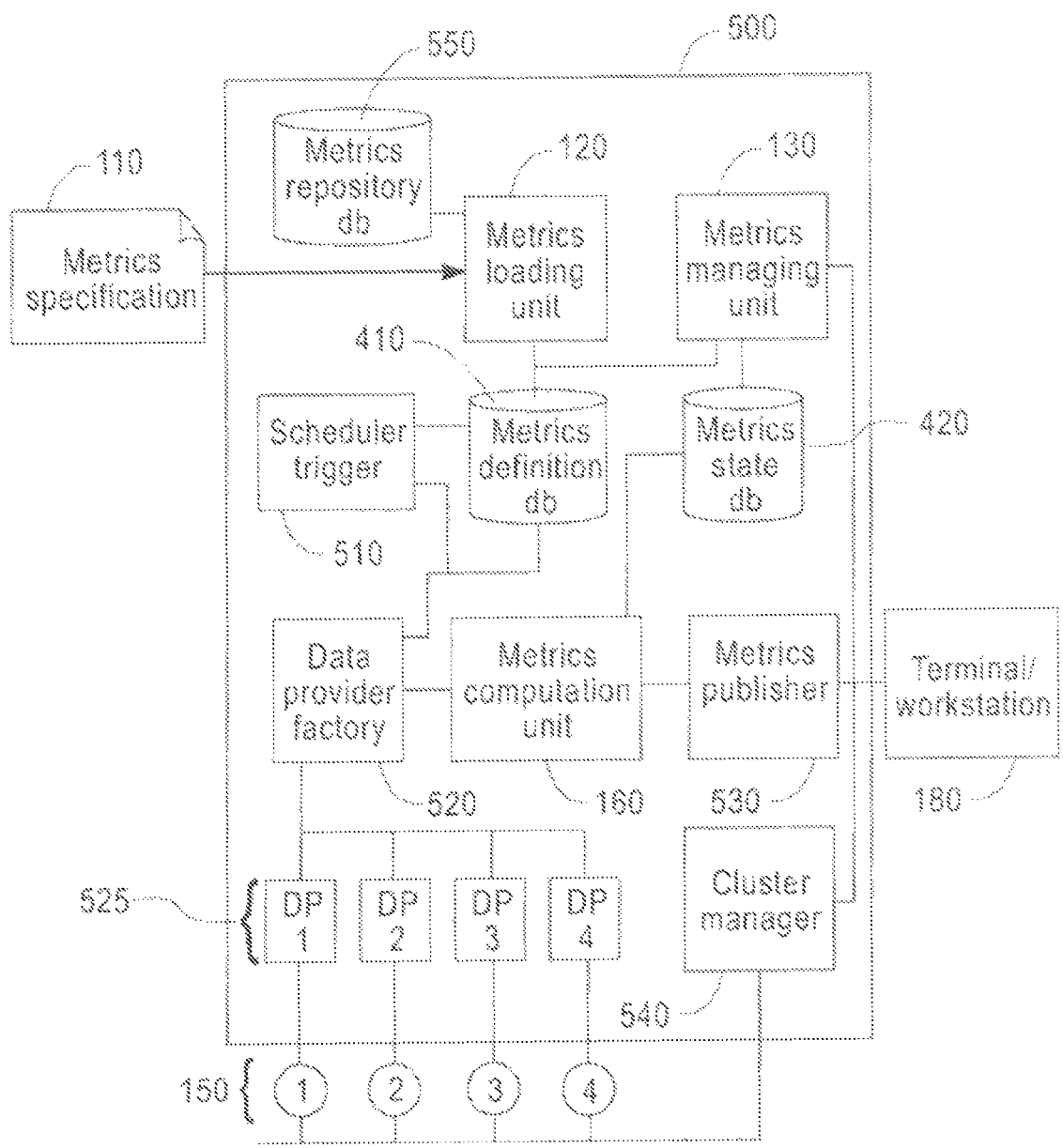
FIG. 5 is a block diagram of a measuring system according to an exemplary embodiment of the present invention.

FIG. 5 is a block diagram of a measuring system 500 according to an exemplary embodiment of the present invention. Referring to FIG. 5, the measuring system 500 includes a metrics loading unit 120, a metrics definition database 410, a metrics managing unit 130, a metrics state database 420, a scheduler/trigger unit 510, a data provider factory 520, data providers 525, a metrics publisher 530, and a cluster manager 540.

The measuring system 500 is connected to a remote terminal or workstation 180 across a network for the exchange of metric measurements calculated across the cluster of nodes 150.

The cluster manager 540 manages the cluster of nodes 150 and sends cluster state change information to the metrics managing unit 130. The cluster state change information includes information regarding whether a particular node has been added or deleted to/from the cluster of nodes 150 and information regarding the current node membership of an aggregate metric defined by an aggregate metric definition.

The data provider factory 520 creates data providers 525 based on a measurement directive in the metrics specification 110 for a corresponding metric that is not computed (i.e., a basic metric) but instead read from instrumentation. The type of data provider created depends on the description of the metric. Each of the data providers 525 reads data from a node instrumentation if requested and receives data events from nodes of the cluster of nodes 150. If events are received, the scheduler/trigger unit 510 is notified and can trigger the corresponding computation of dependent metric by the metrics computation unit 160.

The scheduler/trigger unit 510 triggers the computation of metrics based on functions defined in the metrics specification 110. The metrics loading unit 120 parses the metrics specification for functions that have a schedule as a parameter. These functions are then stored in the metrics definition database 125. The scheduler/trigger unit 510 triggers the metrics computation unit 160 to executes these functions based on the corresponding schedule. As an example, assume that the aggregate metric average application response time is computed by a related function in the metrics specification 110 with a schedule of every minute. This means that the scheduler/trigger unit 410 will trigger the metrics computation unit 160 to re-compute the aggregate metric average response time every minute. The schedule/trigger unit 510 may also trigger the data providers to re-read data from their respective nodes based on the same schedule (e.g., 1 minute) or some other rate based on an additional scheduling definition in the metrics specification 110.

The metrics publisher 530 interfaces with a remote user on the terminal or workstation 180 over a network. The remote user registers with the metrics publisher 530 for a subscription of metric measurements. The remote user can use the metric measurements to make adjustments to the system being monitored. For example, if the metric measurements indicate system performance is bad, the user could add another computing node to the system or stop the execution of a process. The metrics publisher 530 may provide a list of currently available metrics. The remote user can then subscribe for a set of these metrics and specify the rate at which the metrics publisher 530 should send the metrics. The metrics publisher 530 may also charge the remote user a monetary fee based on the contents of the subscription. The metrics publisher 530 may also interface with a user on a directly connected workstation or terminal. While only a single remote user is illustrated, the present invention is not limited thereto, as the metrics publisher 530 may interface with any number of users or remote users.

The measuring system 500 may also include a metrics specification repository 550 for storing a backup copy of the metrics specification 110, obviating the need to re-load the metrics specification 110.

Figure 6:
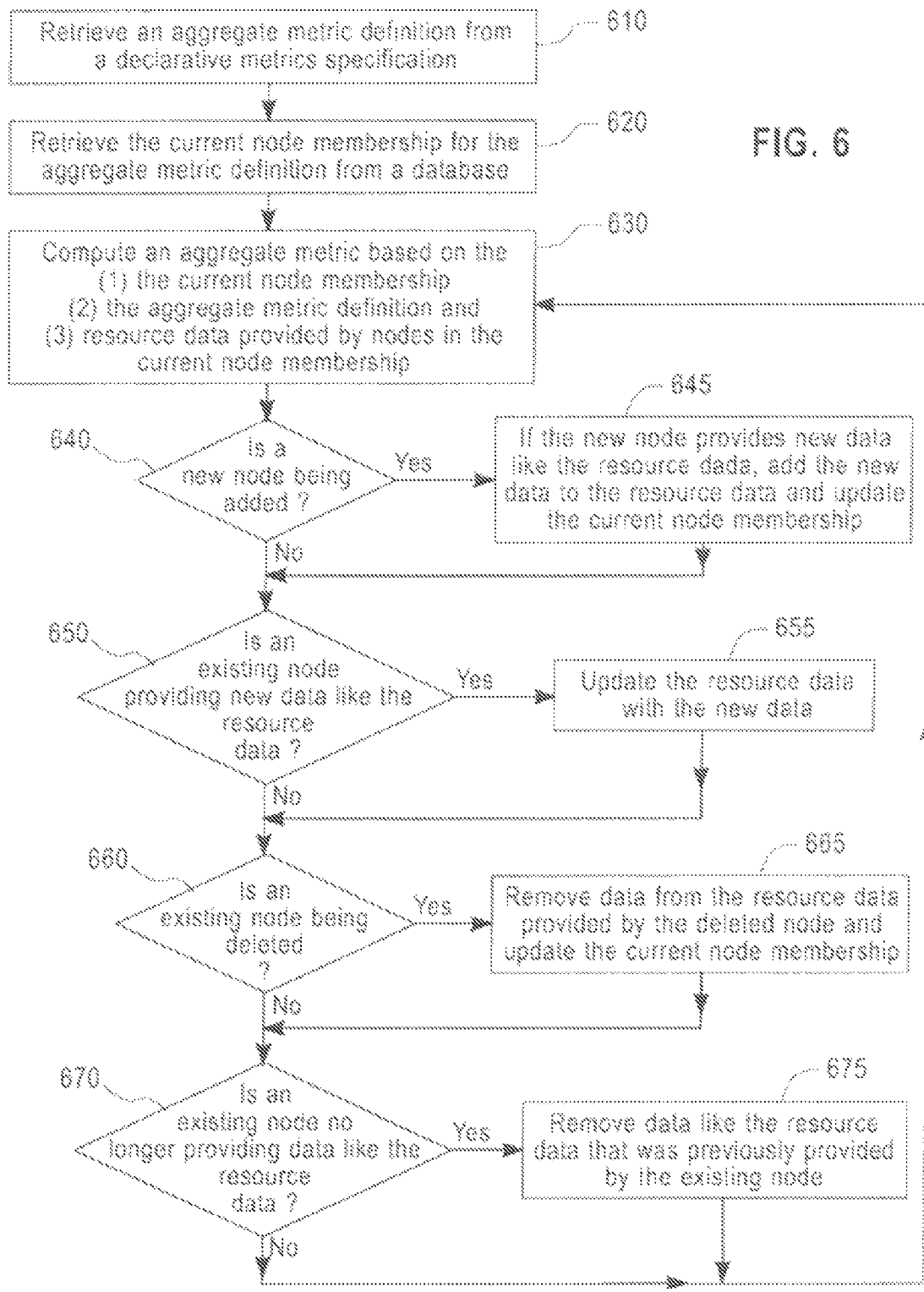
FIG. 6 is flow chart which illustrates a measuring method according to an exemplary embodiment of the present invention.

FIG. 6 is high-level flow chart which illustrates a method of measuring an aggregate metric from among a dynamically varying number of nodes according to an exemplary embodiment of the present invention. Referring to FIG. 6, the method includes the steps of retrieving an aggregate metric definition from a declarative metrics specification 610, retrieving a current node membership for the aggregate metric definition from a database 620, and computing an aggregate metric based on the current node membership, the aggregate metric definition, and resource data provided by nodes in the current node membership 630. The later steps (640-675) illustrated in FIG. 6 may be executed when the state of the system being measured changes. Such a state change typically occurs when a new node is added or deleted to/from the measured system. However, a state change may also occur when an existing node which was producing resource data for an aggregate metric, stops or begins producing the resource data for the first time. An example of this is a node that used to execute a particular application that was being monitoring according to an aggregate metric. Since the node is no longer executing the monitored application, its prior contribution to the resource data should be removed and the aggregate metric should be re-calculated.

Accordingly, the method may further include a step which determines whether a new node has been added to the measured system 640. If a new node has been added and the new node provides data like the resource data (i.e., data that can be used to calculate the aggregate metric being monitored which is based on an aggregate metric definition), the new data is added to the resource data and the current node membership is updated to include the new node 645.

The method may further include a step of determining whether an existing node of the measured system is providing new data like the resource data 650. If the existing node is providing such data, the resource data is updated to include the new data 655.

The method may further include a step of determining whether an existing node of the measured system is being deleted 660. If an existing node has been deleted, previous resource data supplied by the existing node for the aggregate metric is removed from the resource data and the current node membership for the aggregate metric is updated to no longer include the existing node 665.

The method may further include a step of determining whether an existing node is no longer providing resource data for the aggregate metric 670. If the existing node is no longer providing such data, this data is removed from the resource data 675.

The method further includes a step of re-calculating the metric based on the current node membership, the aggregate metric definition, and the resource data provided by the nodes in the current node membership 630. The step of re-calculating may be performed periodically based on a scheduling parameter defined in the metrics specification.

According to an exemplary embodiment of the present invention a computer-readable medium is provided which includes computer code for measuring performance of a system. The computer code for measuring performance of a system includes computer code for retrieving a metric definition from a declarative metrics specification, computer code for retrieving a set of the computing nodes which are currently assigned to the metric definition from a database and computer code for determining the metric of system performance based on the metric definition, the set of computing nodes, and resource data provided by the set of computing nodes. The set of computing nodes are nodes of a cluster of computing nodes having a dynamically varying node count.

The computer code for determining the metric of system performance may be triggered by computer code at a periodic rate determined by a scheduling parameter read in from the declarative metrics specification.

The computer code for measuring a metric of system performance may further include computer code for adding a new node having new data related to the resource data to the cluster of nodes by adding the new node to the set of computing nodes to generate a new set of computing nodes, computer code for adding the new data to the resource data to generate new resource data, and computer code for determining a new metric of system performance based on the new set of computing nodes, the metric definition, and the new resource data. The computer code for measuring a metric of system performance may further include computer code computer code for deleting an existing node having data relating to the resource data from the cluster of computing nodes by deleting an existing node from the set of computing nodes to generate a new set of computing nodes, and computer code for determining a new metric of system performance based on the new set of computing nodes, the metric definition, and the resource data.

Figure 7:
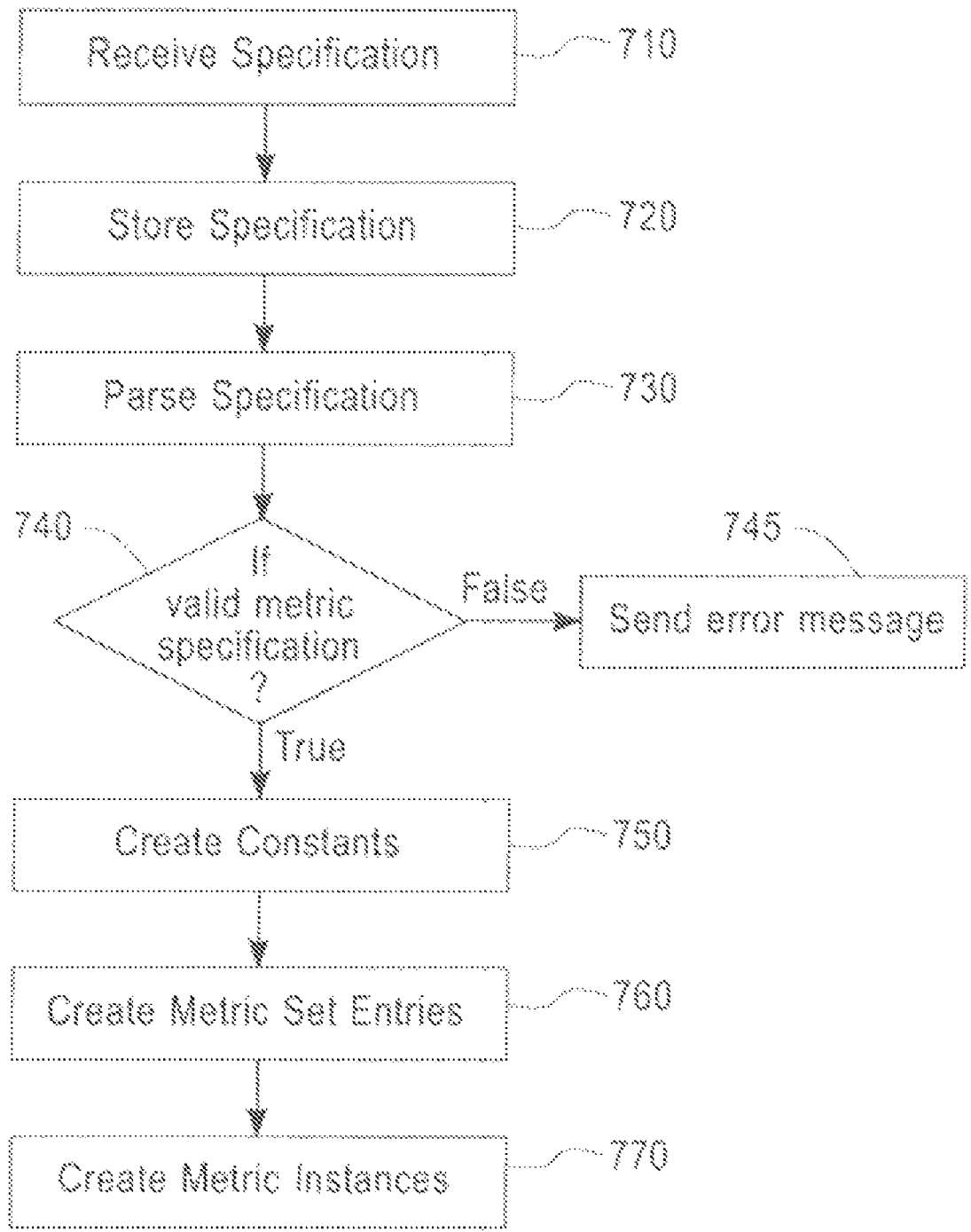
FIGS. 7-12 are flow charts which illustrate a measuring method according to an exemplary embodiment of the present invention.

FIGS. 7-12 are flowcharts which illustrate a method of measuring an aggregate metric from among from among a dynamically varying number of nodes according to an exemplary embodiment of the present invention. Referring to FIG. 7, a metrics specification is received 710. Then the metrics specification is stored 720. A parsing of the metrics specification occurs next 730. It is then determined whether the metrics specification is valid 740. If the metrics specification is not valid, an error message is returned 740. If the metrics specification is valid any parsed constants are created 750, metric set entries are created 760, and metric instances are created 770.

Figure 8:
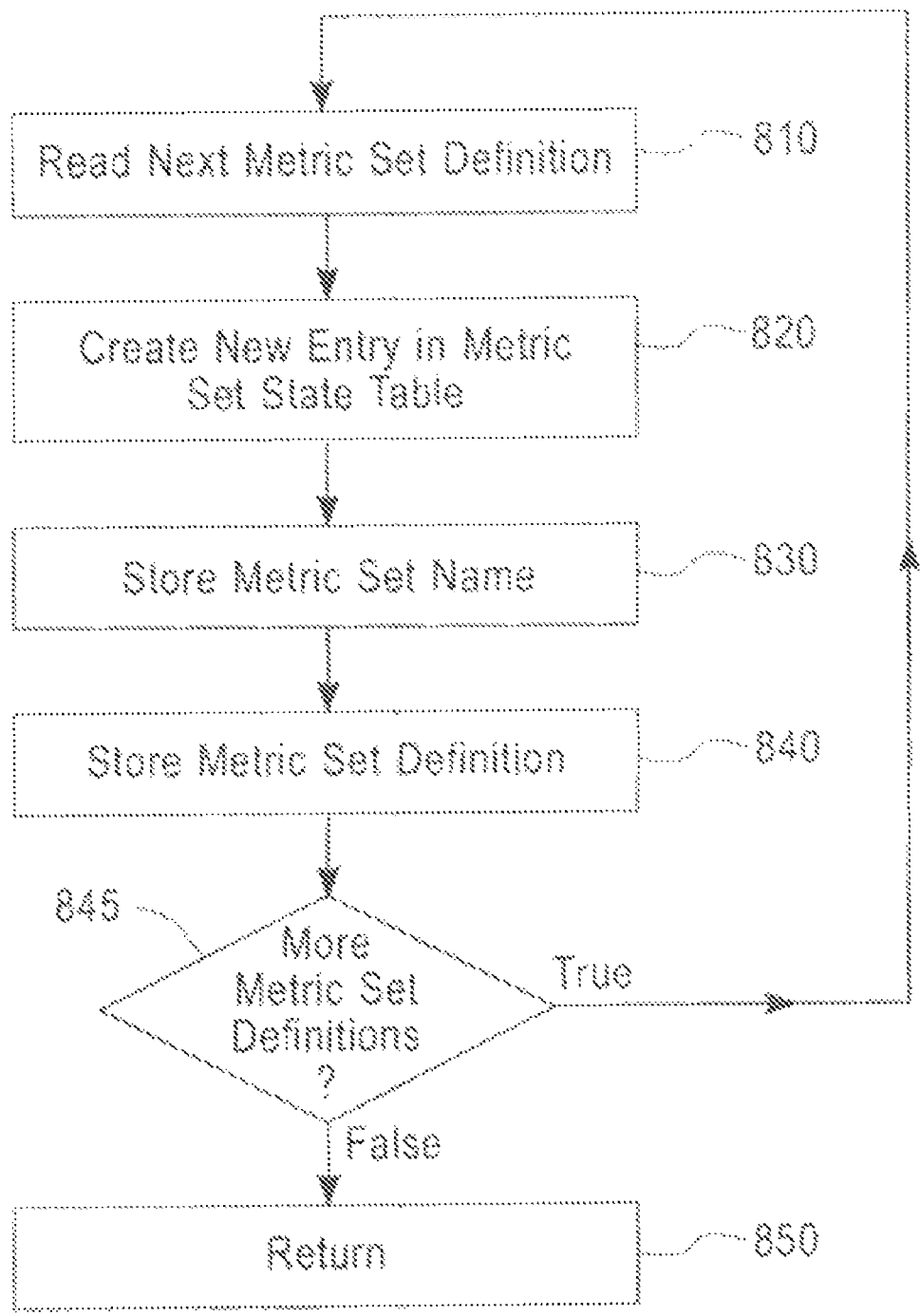

FIG. 8 illustrates the process of creating metric set entries 760 of FIG. 7. Referring to FIG. 8, the next metric set definition encountered in the metrics specification is read 810. A new entry in the metric set state table is created for read metric set definition 820. The name of metric set within the read metric set definition is stored in the entry 830. The metric set definition is stored in the metric state table 840. Any additional metric set definitions in the metrics specification are read in 845 and the prior steps 810-840 are performed on these additional metric set definitions. The process of creating metric set entries then returns 850.

Figure 9:
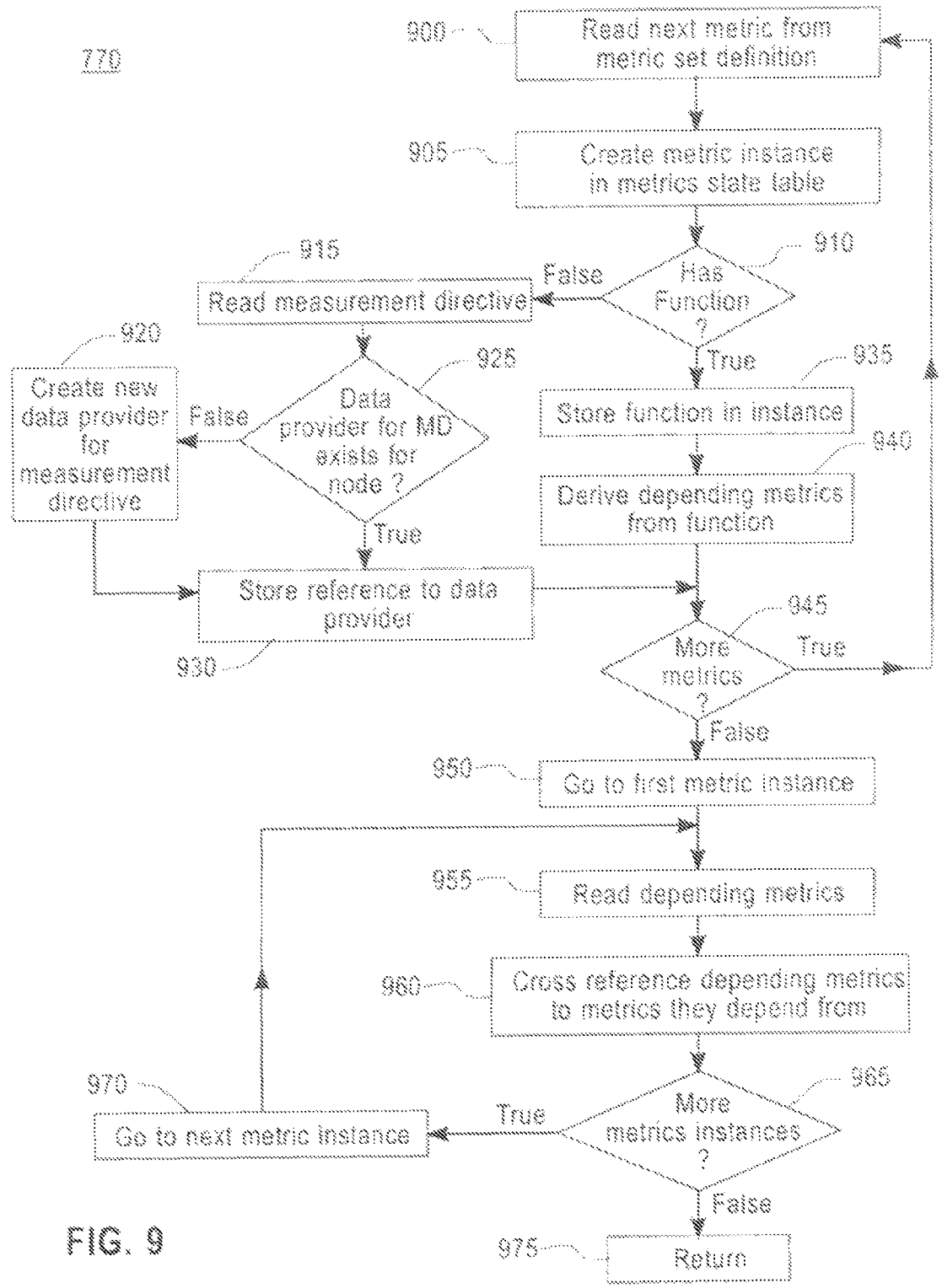

FIG. 9 illustrates the process of creating metric instances 770 of FIG. 7. A metric is read from the metric set definition 900. A metric instance is created in the metrics state table for the metric 905. It is then determined whether the metric has a function 910. If the metric does not have a function, a measurement directive is read from the metric 916. It is then determined whether a data provider exists for a computing node of the measurement directive 920. If a data provider does not exist, a new data provider is created for the measurement directive for that computing node 925. If the data provider does exist, then a reference to the data provider is stored with the metric instance to be used for metric computation later 930. If the metric does have a function that function is stored within the metric instance 935. The depending metrics of the function are derived 940. The previous steps 900-940 are performed on any additional metrics 945. Next the first metric instance is operated on 950. The depending metrics of the first metric instance are read 955. The depending metrics are cross-referenced to the metrics they depend from 960. It is then determined whether there are additional metric instances 965. If there is a next metric it is operated on 970 and then the previous steps 955-960 are performed on the next metric instance. The process of creating metric instances 770 then returns 975.

Figure 10:
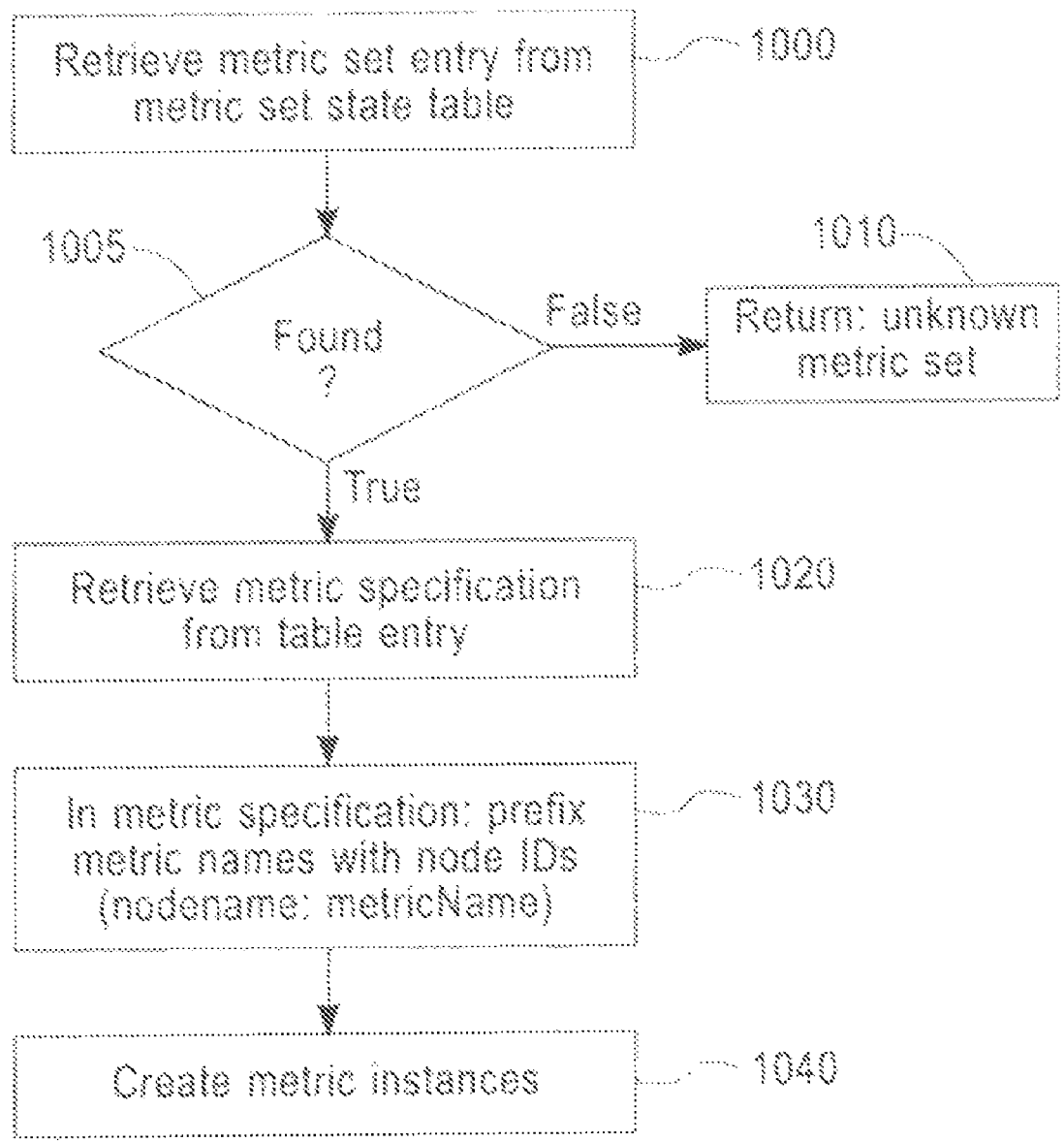

FIG. 10 is a flow chart which illustrates a cluster manager adding a computing node to metric set. The cluster manager informs a metrics state manager that a node has been added and provides the manager with the name of the node and a metric set name. The metric state manager attempts to retrieve a metric set entry from the metric set state table which has the metric set name indicated by the cluster manager 1000. If a matching metric entry is not found 1005, an unknown metric error will be returned 1010. If a matching metric is found 1005, the metric set definition for the metric set entry is retrieved 1020. The metric set name is then prefixed to include the node name 1030. Metric instances having the new metric set name are then created by the process described in FIG. 9 770.

Figure 11:
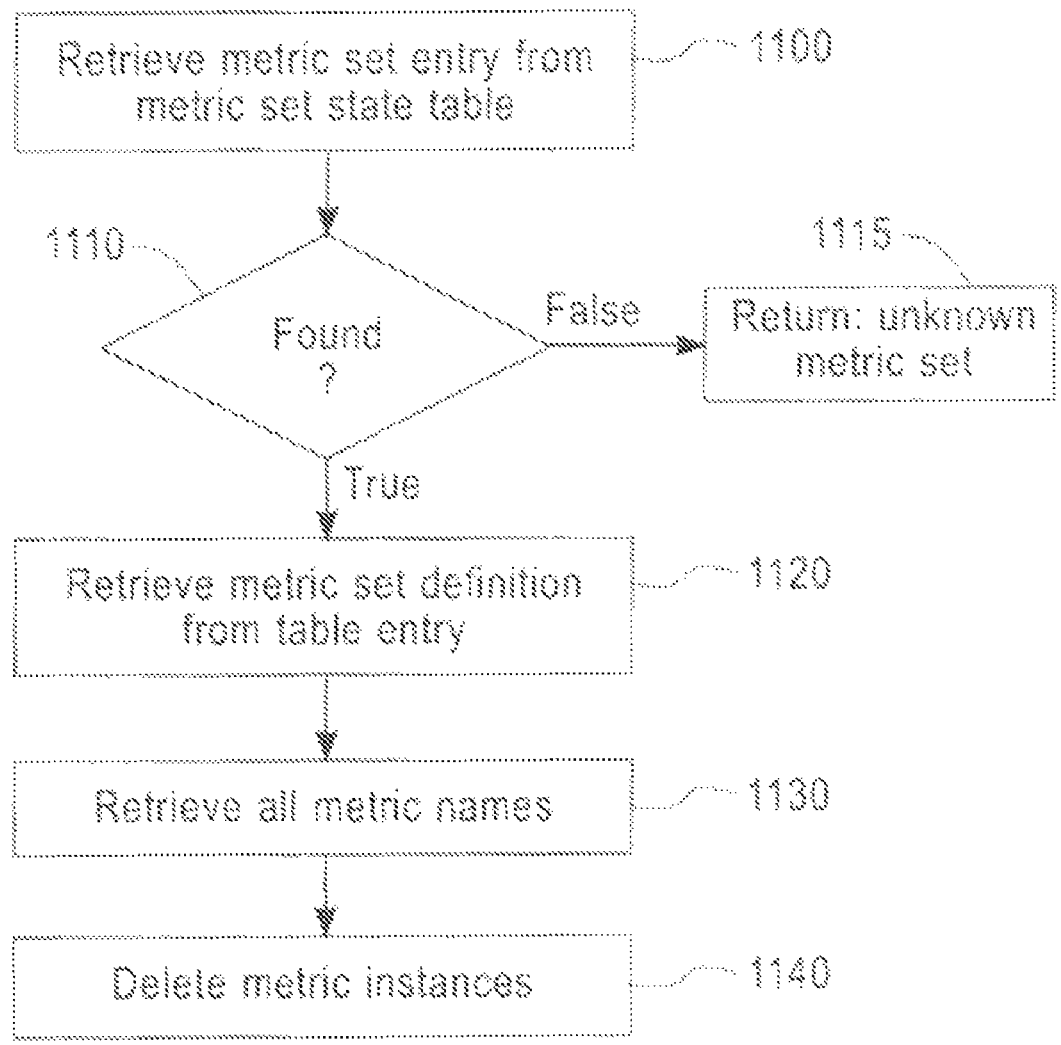

FIG. 11 is a flow chart which illustrates a cluster manager deleting a computing node from a metric set. The cluster manager informs a metrics state manager that a node has been deleted and provides the manager with the name of the node and a metric set name. The metric state manager attempts to retrieve a metric set entry from the metric set state table which has the metric set name indicated by the cluster manager 1100. If a matching metric entry is not found 1110, an unknown metric error will be returned 1115. If a matching metric is found 1110, the metric set definition for the metric set entry is retrieved 1120. All corresponding metric names are retrieved 1130 and the metric instances having those metric names are deleted 1140.

Figure 12:
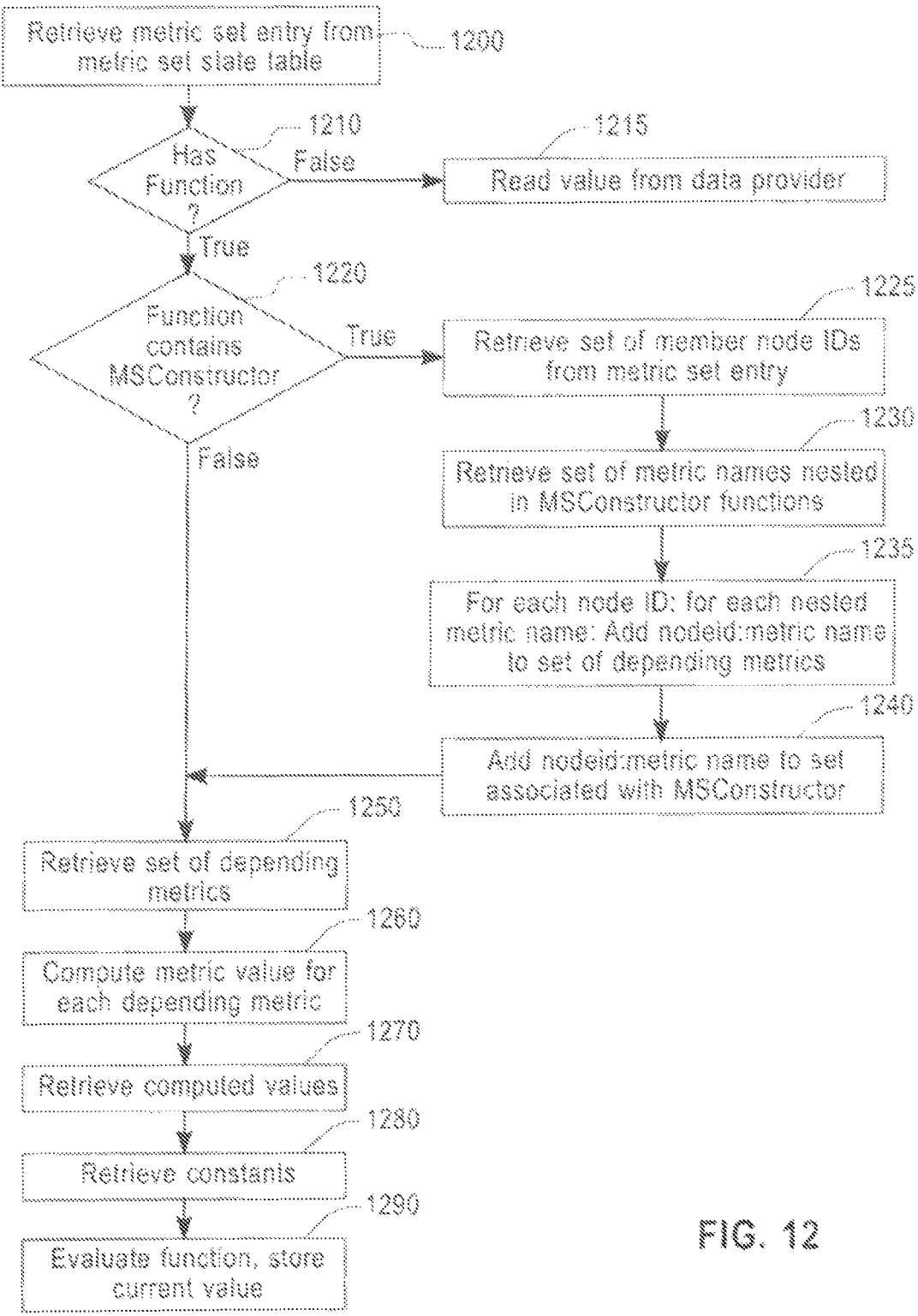

FIG. 12 is a flow chart which illustrates computing the aggregate metric. A metric set entry is retrieved from the metric set state table 1200. It is determined whether the metric set entry has a function 1210. If there is no function a value is read from a data provider 1215. If there is a function it is determined whether the function has metric set constructor 1220. If the function does have a metric set constructor, a set of member nodes ids are retrieved from the metric set entry 1225. A set of metric names nested in the metric set constructor is retrieved 1230. The metric names for each node id are added to a list of depending metrics 1240. The list of depending metrics are added to the metric set constructor 1240. The list of depending metrics are then retrieved 1250, and values of each of the depending metrics are computed 1260. This means, for each depending metric the process of FIG. 12 is applied recursively. The computed values are retrieved 1270, any constants are retrieved 1280, and the function is evaluated 1290.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for measuring performance of a target system comprising a cluster of computing nodes, the method comprising:

retrieving, by a processor of a measuring system communicating with the cluster, a metric definition from a declarative metrics specification stored on the measuring system, wherein the metric definition includes a metric operable on data resulting from execution of a same computer application on at least two of the computing nodes, the metric including an equation for combining the data into an aggregate metric;

obtaining, by the processor, a list of at least two of the computing nodes that are currently assigned to the metric definition from a database that resides on the measuring system; generating, by the processor, a metric set including the equation and at least two elements corresponding to the at least two computing nodes, wherein each element includes a data collection function that collects part of the data from the corresponding computing node; and calculating, by the processor, the aggregate metric based on the equation and the collected parts of the data, wherein the equation calculates an average number of invocations of the computer application across the at least two computing nodes.

2. The method of claim 1, further comprising using the aggregate metric to adjust performance of the target system.

3. The method of claim 1, wherein the aggregate metric is a measure of at least one of queue length, memory usage, number of sockets, number of connections, number of dropped connections, or number of concurrent users associated with the computer application.

4. The method of claim 1, further comprising:

sensing, by the processor, for a new node other than the at least two computing nodes that is executing the application;

adding, by the processor, a new element to the metric set, where the new element has a new data collection function to collect part of the data for the new node; and re-calculating, by the processor, the aggregate metric from the parts of the data collected by all the elements and the equation.

5. The method of claim 1, further comprising:

sensing, by the processor, that one of the at least two computing nodes no longer executes the application;

deleting, by the processor, the element that corresponds to the sensed computing node; and re-calculating, by the processor, the aggregate metric using data collected by the elements that remain and the equation.

6. The method of claim 1, wherein calculating the aggregate metric is performed periodically based on a scheduling parameter read in from the metric definition.

7. The method of claim 1, wherein the metric set is organized as a data tree where the elements are leaves of the tree.

8. The method of claim 1, where each of the at least two computing nodes are separate and distinct computers.

9. A non-transitory computer readable medium embodying instructions executed by a processor to perform method steps for measuring performance of a target system, the method steps comprising:

retrieving, by a measuring system communicating with a cluster of computing nodes of the target system, a metric definition from a declarative metrics specification stored on the measuring system, wherein the metric definition includes a metric operable on data resulting from execution of a same computer application on at least two of the computing nodes, the metric including an equation for combining the data into an aggregate metric;

obtaining from a database of the measuring system, a list of at least two of the computing nodes that are currently assigned to the metric definition;

generating, by the processor, a metric set including the equation and at least two elements corresponding to the at least two computing nodes, wherein each element includes a data collection function that collects part of the data from the corresponding computing node; and calculating the aggregate metric based on the equation and the collected parts of the data wherein the equation calculates an average number of invocations of the computer application across the at least two computing nodes.

10. The computer readable medium of claim 9, wherein the calculating of the aggregate metric is triggered at a periodic rate determined by a scheduling parameter located within the metric definition.

11. The computer readable medium of claim 9, the method steps further comprising:

adding a new element to the metric set, where the new element has a new data collection function to collect part of the data for a new node; and re-calculating the aggregate metric from the parts of the data collected by all the elements and the equation.

12. The computer readable medium of claim 9, the method steps further comprising:

deleting one of the elements; and re-calculating the aggregate metric using data collected by the elements that remain and the equation.

13. A measuring system for measuring performance of a target system to be measured, the measuring system comprising:

a processor; and a memory storing a first program, a second program, and a third program for execution by the processor, wherein the first program is configured to receive a declarative metrics specification as input and parse the declarative metrics specification written in a measurement specification language for a metric definition including a metric operable on data resulting from execution of a same computer application on at least two computing nodes of the target system, the metric including an equation for combining the data into an aggregate metric, wherein the second program is configured to maintain a list of the computing nodes and assign the list to the metric definition, and wherein the third program is configured to calculate the aggregate metric using the equation and the data, wherein the equation calculates an average number of invocations of the computer application across the at least two computing nodes.

14. The measuring system of claim 13, further comprising: a cluster manager to manage node changes to the cluster of computing nodes and provide notifications of the changes to the metrics managing unit which uses the notifications to update the list of computing nodes.

15. The measuring system of claim 13, further comprising: a metrics publisher that communicates across a network with a remote user and allows the remote user to register with the metrics publisher to receive the aggregate metric.

16. The measuring system of claim 15, wherein the metrics publisher charges the remote user a fee to monitor the aggregate metric that is based on a rate at which the metric is requested.

17. The measuring system of claim 13, further comprising: a data provider generating unit which generates data providers for each of the nodes in the list of computing nodes to receive the data.

18. The measuring system of claim 13, further comprising: a metrics repository to store a copy of the declarative metrics specification.

* * * * *